United States Patent Office 3,515,602
Patented June 2, 1970

3,515,602
METHOD OF MAKING A SELF-LOCKING SCREW
Alton W. Gross, Laurel Lane,
Farmington, Conn. 06032
No Drawing. Filed Sept. 1, 1967, Ser. No. 664,931
Int. Cl. C21d 1/00, 1/42, 1/52
U.S. Cl. 148—154                           8 Claims

ABSTRACT OF THE DISCLOSURE

A method of manufacture of a self-locking screw wherein a limited region along the length of the screw is annealed to provide a portion which exhibits reduced resistance to torque when compared to the remainder of the screw. The annealed and unannealed portions, being capable of a limited amount of twisting relative to one another, provide locking action when normal driving torque is exceeded.

BACKGROUND OF THE INVENTION

Field of the invention

The present invention relates to the manufacture of screws. More particularly, the present invention is directed to self-locking screws. Accordingly, the general objects of the present invention are to provide new and improved methods and apparatus of such character.

Description of the prior art

There are, of course, a great many applications where it is necessary to provide some form of locking action to prevent screws from coming loose during operation of the apparatus on which they are installed. This is particularly true of cases wherein the apparatus is subject to vibration. Numerous methods of enhancing the locking action of standard screws have been proposed and in some cases implemented.

For example, it has been proposed to coat the threads on a screw with either a soft metal such as solder or one of the commercially available locking compositions. Examples of coating with a soft metal are found in U.S. Pat. No. 202,407 to S. Brunson and U.S. Pat. No. 1,137,941 to I. C. Woodward. Among the disadvantages of the technique as exemplified by the Brunson and Woodward patents is that the treated screws may be used only once and, since a portion of the coating material will come off, invariably the threads of the female member into which the screws are inserted become fouled. In regards to the locking compositions, an example of which is shown in U.S. Pat. No. 2,989,107 to R. W. James et al., fouling of the threads of the female member occurs and, in addition, use in high temperature environments is not recommended since the locking characteristics of the materials decrease with elevated temperature.

It has also been proposed to enhance the locking action of a screw by either inserting ahead of the screw or forming the tip of the screw from a ball of ductile material which may be flattened or otherwise distorted by pressure or impact. The obvious disadvantage of such techniques, which are exemplified by U.S. Pat. No. 1,788,750 to O. C. Snyder and U.S. Pat. No 3,006,671 to W. J. Opocensky, is that single shot devices result and that once locked the locking action cannot be relieved.

Another scheme to enhance the locking action of screws which has been unsuccessfully tried consists of the providing of a frangible intermediate portion of the screw which actually breaks when subjected to torque in excess of that necessary to seat the screw. An example of this technique may be found in U.S. Pat. No. 2,830,635 to H. C. Thorstens. The provision of a frangible portion, like the techniques discussed above, results in a screw which may be used only once and which, in many instances, may not be removed or released once locked in position.

The locking action of a screw may also be enhanced by the provision of a specially contoured thread. An example of a screw with such a contoured thread is shown in U.S. Pat. No. 3,249,142 to H. G. Phiphard, Jr. Screws of the general type of that shown in the Phiphard, Jr. patent are comparatively expensive to produce and thus have not found wide usage.

SUMMARY OF THE INVENTION

The present invention comprises a method for the treatment of screws, produced by standard techniques, to enhance their locking action. This technique consists of the heat treating of a portion of the length, such portion generally being intermediate the ends of the screw, to thereby anneal the thus treated portion. The annealed portion, being softer than the remainder of the screw, permits the twisting of the annealed and unannealed portions relative to one another thus causing distortion of the threads of the screw and enhancing the locking action.

DESCRIPTION OF THE PREFERRED EMBODIMENT

While not limited thereto in its utility, the present invention has been found to be particularly useful in improving the locking capabilities of socket type set screws. The invention contemplates heat treating of one or several threads of an alloy steel screw to thereby anneal the thus heated portion thereby causing its torsional yield strength to decrease. In the case of a socket type set screw, the object of the present invention is to cause the torsional yield strength of the annealed portion of the screw to become less than the torsional yield strength of the hexagonal key which will be used to seat the screw. Tests have shown that such partial annealing results in a screw which does not loosen under vibration and which may be repeatedly used without either failure of the screw itself or damage to the threads of the female member into which the screw is inserted.

It is theorized that the treating step comprising the present invention results in the annealing of the heat treated portion such that the remainder of the screw will twist relative to the annealed portion when normal driving torque is exceeded. The amount or degree of twist needed to enhance locking action is very slight and in practice cannot be adequately measured. However, test screws with an original hardness in the range of 45–53 Rockwell C have been treated by the present invention and, after annealing, the heat treated portion has been found to have a hardness of from 185–285 BHN (Brinell hardness number).

In practice, a standard set screw, usually of the socket type, is selected from stock. A section of the threaded portion of the screw, which section in most cases extends from slightly below the bottom of the socket to the last several threads, is selected for heat treatment. The section of the screw to be heated will be less than 50% of the total length for most set screws. The selected section is then heated to cause annealing. The heat may be applied by an induction furnace, a torch, a laser or electron beam or high frequency resistance heating may be employed. The critical point is that only the desired portion of the screw be heated. Accordingly, the heat source for use with the present invention must be capable of sufficient control so that the thermal energy produced thereby will impinge upon and thus effect only a limited region along the length of the screw being treated. The energy density radiated from the heat source must also be sufficient to anneal the heat treated portion of the screws in a relatively short time thus preventing overheating of the remainder of the screw through thermal conduction. Tests have shown that the treating temperature should be in the range of 1250° F. to 1600° F. with 1375° F. being the average temperature.

While not shown, because it does not constitute part of the present invention, apparatus for heat treating screws in accordance with the present invention may comprise a vibrating hopper which will orient all the screws in the same direction prior to their being fed singly down a tube of electrical insulating material, gravity feed down the tube being employed. The tube passes through a one turn induction heater coil. A stop is positioned in the tube, the stop being electrically connected to means for energizing the induction heater power source. The stop is positioned relative to the induction coil so that the portion of the screw to be treated is centered in the coil, the ends of the screw being disposed above and below the coil. When the screw hits the stop, the induction heater is energized and heating takes place. The induction heating apparatus is suitably programmed so that the flow of current through the induction coil will automatically be terminated after a preselected time period.

In one example, two threads intermediate the ends of a type 4037 alloy steel, socket type, ⅜ inch diameter (⅜—16 x ¾) set screw were heat treated by means of a torch. The treating temperature was between 1425° F. and 1450° F. and the heat was applied for one minute. The locking properties of the thus treated screw were found to be far superior when compared to identical screws selected from stock but not treated in accordance with the present invention. It may be noted that type 4037 alloy steel does not air harden and consequently the upper temperature limit is not as critical as is experienced with steels such as type 4140 which have a tendency to air harden. With the type 4037 alloy steel, the temperature could be permitted to go as high as 1600° F. whereas 1450° F. cannot be exceeded with type 4140 steel.

In another example, another ⅜—16 x ¾ standard socket type set screw comprised of type 4037 alloy steel was selected from stock and heated in an induction heater at a temperature of 1425° F./1450° F. for a period of 10 seconds. As in the case of the screw that was treated with a torch, the induction heated screw had far superior locking characteristics when subject to vibration than identical stock screws which were not treated in accordance with the present invention.

While a preferred embodiment of the present invention has been described, it is to be understood that the present invention has been disclosed by way of illustration and not limitation.

What is claimed is:
1. A method of enhancing the locking characteristics of a threaded type fastener comprising the steps of:
 selecting a heat treated alloy steel threaded fastener;
 positioning the thus selected fastener in proximity to a highly localized heat source; and
 annealing a portion of said threaded fastener disposed intermediate the ends of the threaded portion thereof.

2. The method of claim 1 wherein the fastener selected has an initial hardness of from 45 to 53 Rockwell C and wherein the step of annealing comprises:
 annealing the selected section so as to cause it to have a hardness of 185–285 BHN.

3. The method of claim 1 wherein the step of annealing comprises:
 subjecting the selected intermediate section of the threaded portion of the fastener to a temperature within the range of 1250° F.–1600° F. for a preselected time.

4. The method of claim 1 wherein the step of annealing comprises:
 positioning the fastener with the selected intermediate section inside an induction coil;
 energizing the coil; and
 deenergizing the coil after a preselected time.

5. The method of claim 1 wherein the fastener consists of a socket type set screw having a hardness of from 45–53 Rockwell C and wherein the step of heat treating comprises:
 annealing the selected section to cause its torsional yield strength to become less than the torsional yield strength of the tool employed to seat the screw.

6. The method of claim 5 wherein the step of annealing results in the selected section having a hardness of 185–285 BHN.

7. The method of claim 6 wherein the step of annealing comprises:
 subjecting the selected section to a temperature within the range of 1250° F.–1600° F. for a preselected time.

8. The method of claim 7 wherein the step of subjecting the selected section to an elevated temperature comprises:
 positioning the fastener with the selected intermediate section inside an induction coil;
 energizing the coil; and
 deenergizing the coil after a preselected time.

References Cited

UNITED STATES PATENTS

| | | | |
|---|---|---|---|
| 1,814,966 | 7/1931 | Rosenberg | 85—20 |
| 2,215,930 | 9/1940 | Mahla | 148—147 X |
| 2,576,438 | 11/1951 | Beach | 151—22 X |
| 2,830,635 | 4/1958 | Thorstens | 151—14 |

OTHER REFERENCES

Metals Handbook, published by the ASM, 1964, pp. 174–178, 186–188.

L. DEWAYNE RUTLEDGE, Primary Examiner
G. K. WHITE, Assistant Examiner

U.S. Cl. X.R.
148—39, 134